United States Patent
McGill et al.

(10) Patent No.: US 11,618,476 B2
(45) Date of Patent: Apr. 4, 2023

(54) CURVILINEAR COORDINATE SYSTEMS FOR PREDICTING VEHICLE BEHAVIOR

(71) Applicant: Toyota Research Institute, Inc., Los Altos, CA (US)

(72) Inventors: Stephen G. McGill, Broomall, PA (US); Guy Rosman, Newton, MA (US); Paul Drews, Watertown, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 354 days.

(21) Appl. No.: 16/894,348

(22) Filed: Jun. 5, 2020

(65) Prior Publication Data

US 2021/0380140 A1   Dec. 9, 2021

(51) Int. Cl.
*B60W 60/00* (2020.01)
*G05D 1/00* (2006.01)
*G08G 1/00* (2006.01)
*B60W 40/072* (2012.01)

(52) U.S. Cl.
CPC ...... *B60W 60/0025* (2020.02); *B60W 40/072* (2013.01); *G05D 1/0088* (2013.01); *G08G 1/22* (2013.01); *B60W 2510/20* (2013.01); *B60W 2540/20* (2013.01); *B60W 2540/225* (2020.02); *B60W 2552/30* (2020.02); *B60W 2552/53* (2020.02); *B60W 2556/45* (2020.02)

(58) Field of Classification Search
CPC ....... B60W 2540/225; B60W 2552/53; B60W 2556/45; B60W 2552/30; B60W 2510/20; B60W 2540/20
See application file for complete search history.

(56) References Cited

U.S. PATENT DOCUMENTS

| | | | |
|---|---|---|---|
| 9,784,592 B2 | 10/2017 | Gupta et al. | |
| 10,147,003 B2 | 12/2018 | Kizumi | |
| 10,486,707 B2 | 11/2019 | Zelman et al. | |
| 2010/0023216 A1 | 1/2010 | Huang et al. | |
| 2020/0302783 A1* | 3/2020 | Altendorfer | G08G 1/0133 |
| 2020/0379461 A1* | 12/2020 | Singh | G05D 1/0088 |
| 2022/0080961 A1* | 3/2022 | Lienke | B60W 30/0956 |

FOREIGN PATENT DOCUMENTS

CN    104494600 B    11/2016

OTHER PUBLICATIONS

J. Kim and D. Kum, "Collision Risk Assessment Algorithm via Lane-Based Probabilistic Motion Prediction of Surrounding Vehicles," in IEEE Transactions on Intelligent Transportation Systems, vol. 19, No. 9, pp. 2965-2976, Sep. 2018, doi: 10.1109/TITS.2017.2768318. (Year: 2018).*

(Continued)

*Primary Examiner* — Gertrude Arthur Jeanglaude
*Assistant Examiner* — Brittany Renee Peko
(74) *Attorney, Agent, or Firm* — Dinsmore & Shohl LLC

(57) ABSTRACT

A method including generating a curvilinear coordinate system from a current position of the vehicle. The method further includes generating a probability distribution from the curvilinear coordinate system and predicting a future vehicle behavior of the vehicle based on the probability distribution.

19 Claims, 9 Drawing Sheets

(56) References Cited

OTHER PUBLICATIONS

J. Ibanez-Guzman, S. Lefevre, A. Mokkadem and S. Rodhaim, "Vehicle to vehicle communications applied to road intersection safety, field results," 13th International IEEE Conference on Intelligent Transportation Systems, 2010, pp. 192-197, doi: 10.1109/ITSC.2010.5625246. (Year: 2010).*
S. Schnelle, J. Wang, H. Su and R. Jagacinski, "A Driver Steering Model With Personalized Desired Path Generation," in IEEE Transactions on Systems, Man, and Cybernetics: Systems, vol. 47, No. 1, pp. 111-120, Jan. 2017, doi: 10.1109/TSMC.2016.2529582. (Year: 2017).*
Kuan-Yuan Ren, et al. "Analysis of Drivers' Eye-Movement Characteristics When Driving Around Curves" (https://www.hindawi.com/journals/ddns/2015/462792/). Hindawi. Published: Mar. 2015.
Thomas Streubel, et al. "Prediction of Driver Intended Path at Intersections" (https://www.researchgate.net/publication/269294116_Prediction_of_driver_intended_path_at_intersections). Research Gate. Published: Jun. 2014.
Shinko Yuanhsien Cheng, et al. "Turn-Intent Analysis Using Body Pose for Intelligent Driver Assistance" (http://citeseerx.ist.psu.edu/viewdoc/download?doi=10.1.1.157.1401&rep=rep1&type=pdf). IEEE CS and IEEE ComSoc. Published: Oct. 2006.

\* cited by examiner

CURVILINEAR COORDINATE SYSTEMS FOR PREDICTING VEHICLE BEHAVIOR

FIELD

The present specification generally relates to predicting vehicle behaviors, and more specifically, to generating and implementing curvilinear coordinate systems for predicting the vehicle behaviors.

TECHNICAL BACKGROUND

Computational models may be used to predict a variety of vehicle behaviors or driver decisions. However, many of these models and predictions are limited by their inability to predict a continuous vehicle movement. For instance, models may exist that can predict whether a vehicle will proceed straight through an intersection or turn left or right at the intersection. In reality, though, there are significantly more options available to the vehicle and driver in physical space. Not only do these computational models fail to account for the multitude of possible paths a vehicle may take while turning right, for instance, but these models also lack continuity. For instance, the model may predict that a vehicle will travel straight through an intersection until enough data is collected that indicates the vehicle will turn right. At this instantaneous point in time, the model may then predict the vehicle will turn right, ignoring any continuity of vehicle travel and a vehicle's inability to make instantaneous, ninety-degree turns.

Accordingly, a need exists for alternative methods of predicting vehicle behavior that may more accurately model a vehicle's options in the physical world.

SUMMARY

In one embodiment, a method including generating a curvilinear coordinate system from a current position of a vehicle. The method further includes generating a probability distribution from the curvilinear coordinate system and predicting a future vehicle behavior of the vehicle based on the probability distribution.

In another embodiment, a vehicle having a motor, two wheels, and an electronic vehicle system in wireless communication with a remote computing device configured to generate a curvilinear coordinate system from a current position of the vehicle based on environmental parameters and vehicle parameters. The remote computing device of the vehicle is further configured to generate a probability distribution from the curvilinear coordinate system and predict a future vehicle behavior of the vehicle based on the probability distribution.

In another embodiment, a system for predicting a future vehicle behavior of a vehicle. The system includes an electronic processing device comprising computer readable instructions, that when executed, cause the electronic processing device to: collect environmental and vehicle parameters for the vehicle; generate a curvilinear coordinate system from a current position of the vehicle based on the environmental and vehicle parameters; generate a probability distribution from the curvilinear coordinate system; and predict the future vehicle behavior of the vehicle based on the probability distribution. The curvilinear coordinate system includes turning horizons that increase in diameter with time. A circumference of each turning horizon comprises points in space, and the turning horizons are tangential at a point representing the current position of the vehicle. The curvilinear coordinate system includes radii of curvature. Each radius of curvature represents a potential path of the vehicle in space and emanates from the point representing the current position of the vehicle. The future vehicle behavior of the vehicle comprises travelling a radius of curvature to a point in space on a turning horizon.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to a method of generating and utilizing a curvilinear coordinate system for predicting a future vehicle behavior or maneuver. The curvilinear coordinate system has turning horizons that increase in diameter with time, where a circumference of each turning horizon comprises points in space. The curvilinear coordinate system has radii of curvature, where each radius of curvature represents a potential path of the vehicle in space. The method further includes generating a probability distribution from the curvilinear coordinate system and predicting a future vehicle behavior, where the future vehicle behavior includes travelling a radius of curvature to a point in space on a turning horizon. The curvilinear coordinate system and probability distribution are based on environmental parameters and vehicle parameters. The curvilinear coordinate system and the probability distribution may continuously update in time. Additionally, the curvilinear system may be analyzed in continuous space or may be discretized.

Figure 1:
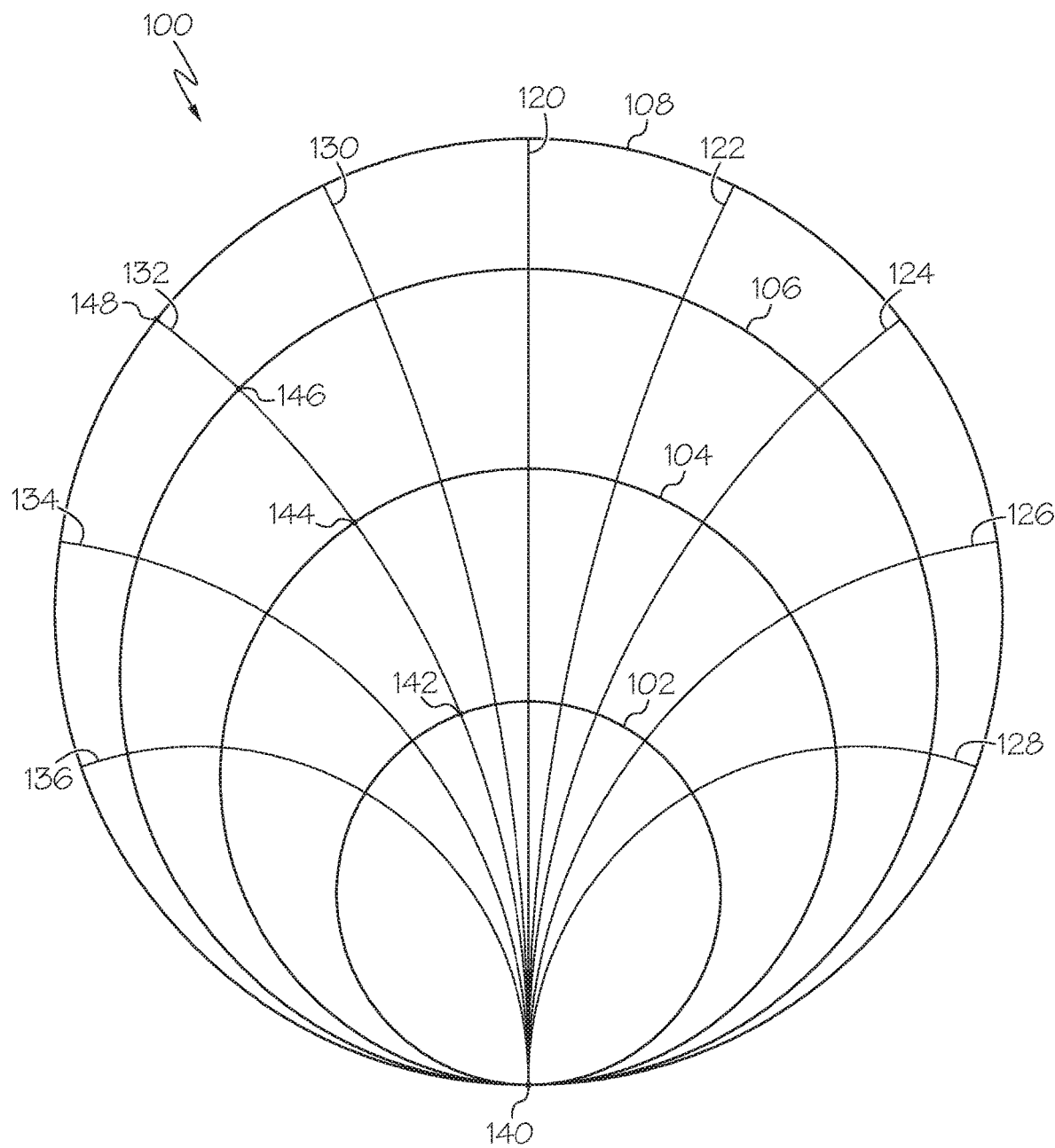
FIG. 1 schematically depicts a curvilinear coordinate system generated at a first point in time, according to one or more embodiments shown or described herein.

Referring now to FIG. 1, a general curvilinear coordinate system 100 is depicted and described. The curvilinear coordinate system 100 comprises turning horizons 102, 104, 106, and 108. While four turning horizons are depicted, it should be appreciated that the curvilinear coordinate system 100 may include any desirable number of turning horizons. In some embodiments, the curvilinear coordinate system 100 may include an infinite number of turning horizons. Each turning horizon may represent a distinct point in time. For instance, the turning horizon 102 may represent time t=1, the turning horizon 104 may represent time t=2, the turning horizon 106 may represent time t=3, and the turning horizon 108 may represent time t=4. The time increments may be any suitable amount of time. For instance, the difference in time between each turning horizon may be seconds, milliseconds, or any desirable amount of time. The diameter of each turning horizon increases with time. For instance, the diameter of turning horizon 104 at t=2 is greater than the diameter of turning horizon 102 at t=1. The turning horizons are tangential at a seed point 140. The seed point 140 represents a current point in time, or t=0. The circumferences of the turning horizons represent points in space. For instance, points 142, 144, 146, and 148 represent distinct points in space on the turning horizons 102, 104, 106, and 108, respectively. While one point in space is depicted on each turning horizon, it should be appreciated that the entire circumference of each turning horizon is comprised of points in space. The seed point 140 represents an initial point in space, and more particularly an initial or current position of a vehicle.

The curvilinear coordinate system 100 further comprises radii of curvature 120, 122, 124, 126, 128, 130, 132, 134, and 136. The radius of curvature 120 is a predominantly straight line. The radii of curvature 122, 124, 126, and 128 curve to the right of the radius of curvature 120 to various degrees. The radii of curvature 130, 132, 134, and 136 curve to the left of the radius of curvature 120 to various degrees. While nine radii of curvature are depicted, it should be appreciated that the curvilinear coordinate system 100 may include any suitable or desirable number of radii of curvature. While a symmetrical distribution of radii of curvature is depicted, it should be appreciated that the radii of curvature may be desirably distributed throughout the curvilinear coordinate system 100. In some embodiments, the curvilinear coordinate system may include an infinite number of radii of curvature. The radii of curvature emanate from the seed point 140. Each radius of curvature intersects each turning horizon of the curvilinear coordinate system 100. Each radius of curvature represents a potential continuous path of travel of the vehicle in space.

Figure 2:
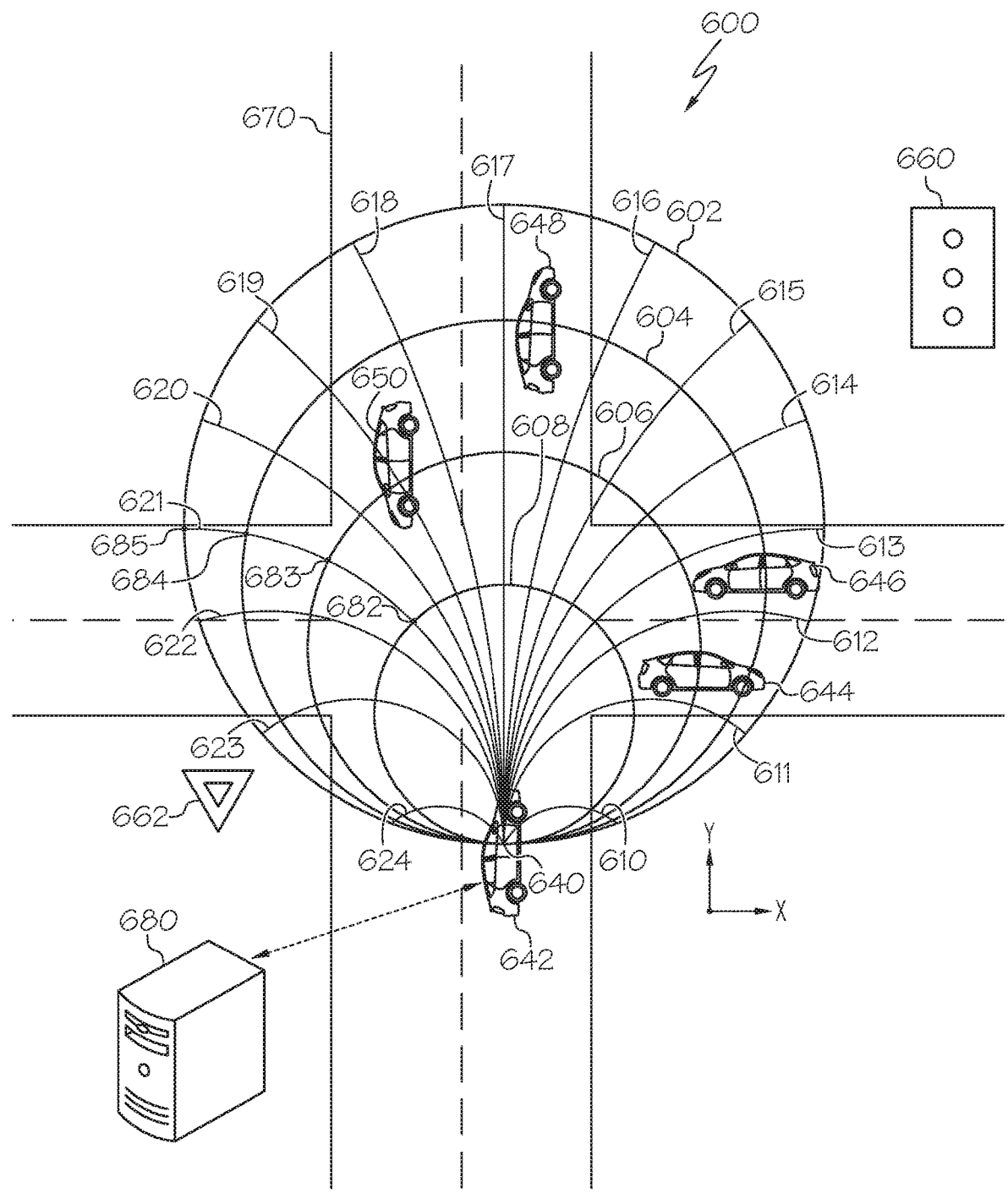
FIG. 2 schematically depicts a curvilinear coordinate system generated for a vehicle, according to one or more embodiment shown or described herein.

With reference now to FIG. 2, an example of a curvilinear coordinate system 600 as generated and applied with respect to a vehicle 642 is depicted. The vehicle 642 is positioned at seed point 640. The curvilinear coordinate system 600 includes turning horizons 602, 604, 606, and 608. The turning horizons are tangential at the seed point 640, representing the current position of the vehicle 642. While four turning horizons are depicted, it should be appreciated that any number of turning horizons may be implemented in the curvilinear coordinate system 600. The curvilinear coordinate system 600 also includes fifteen radii of curvature 610-624. The radii of curvature emanate from the seed point 640. While fifteen radii of curvature are depicted, it should be appreciated that any desirable number of radii of curvature can be included in the curvilinear coordinate system 600. The number of radii of curvature may be infinite, accounting for every theoretical movement of vehicle 642. In other embodiments, the number of radii of curvature may be limited to what is physically possible for the vehicle 642. For example, if the vehicle cannot travel a certain radius of curvature, due to a turning radius capacity of the vehicle 642, for instance, this radius of curvature may not be included in the curvilinear coordinate system 600. In yet other embodiments, the number of radii of curvature may be limited by not just what is physically possible for the vehicle 642, but also by what is environmentally probably. For example, if the vehicle 642 were to travel the radius of curvature 615, it would effectively be travelling off of paved roadway 670. For that reason, in some embodiments, the radius of curvature 615 may not be included in the curvilinear coordinate system 600. A number of vehicle and environmental parameters may be accounted for in generating the curvilinear coordinate system 600, as will be discussed in more detail below. After the curvilinear coordinate system 600 is generated, a probability distribution may be generated based on the curvilinear coordinate system 600 and the vehicle and environmental parameters used to generate the curvilinear coordinate system 600. The probability distribution may be generated in continuous space, or the curvilinear coordinate system 600 may be discretized prior to generation of the probability distribution, as will be discussed in further detail below. The probability distribution allows the curvilinear coordinate system 600 to be analyzed. Out of all theoretically or physically possible vehicle paths of travel, or radii of curvature, the probability distribution allows for identification of what is the most likely radius of curvature for the vehicle 642 to travel.

Figure 3:
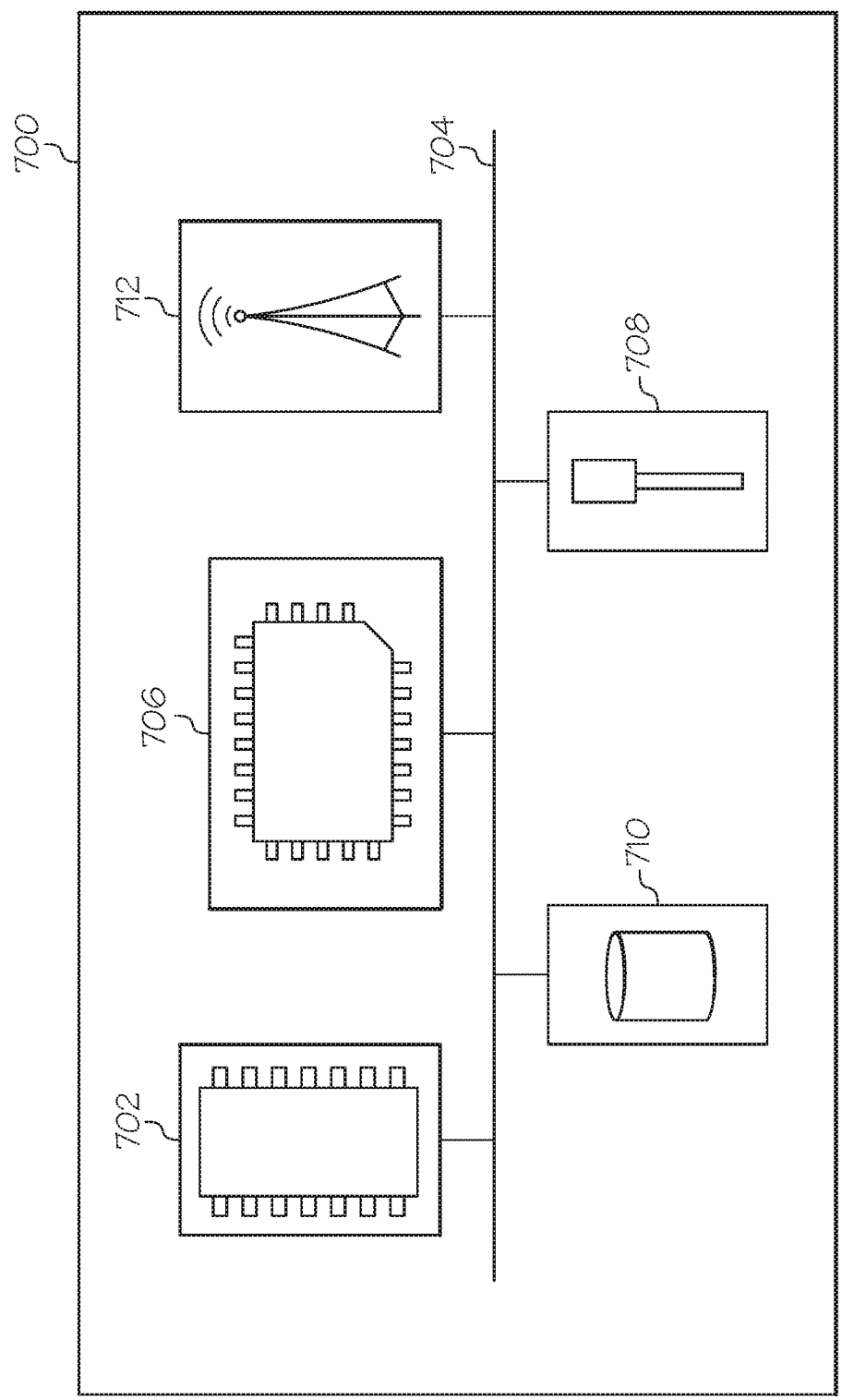
FIG. 3 schematically depicts a vehicle system for generating curvilinear coordinate systems and predicting future vehicle behaviors, according to one or more embodiments shown or described herein.

FIG. 3 depicts an example vehicle system 700 included in the vehicle 642 of FIG. 2. The vehicle system 700 includes one or more processors 702, a communication path 704, one or more memory modules 706, a satellite antenna 708, one or more vehicle sensors 710, and network interface hardware 712, the details of which will be set forth in the following paragraphs. The vehicle system 700 may also include one or more modules for performing autonomous driving of the vehicle 642. It should be understood that the vehicle system 700 of FIG. 3 is provided for illustrative purposes only, and that other vehicle systems 700 comprising more, fewer, or different components may be utilized.

Each of the one or more processors 702 may be any device capable of executing machine readable and executable instructions. Accordingly, each of the one or more processors 702 may be a controller, an integrated circuit, a microchip, a computer, or any other computing device. The one or more processors 702 are coupled to a communication path 704 that provides signal interconnectivity between various modules of the vehicle system 700. Accordingly, the communication path 704 may communicatively couple any number of processors 702 with one another, and allow the modules coupled to the communication path 704 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 704 may be formed from any medium that is capable of transmitting a signal such as, for example, conductive wires, conductive traces, optical waveguides, or the like. In some embodiments, the communication path 704 may facilitate the transmission of wireless signals, such as WiFi, Bluetooth®, Near Field Communication (NFC) and the like. Moreover, the communication path 704 may be formed from a combination of mediums capable of transmitting signals. In one embodiment, the communication path 704 comprises a combination of conductive traces, conductive wires, connectors, and buses that cooperate to permit the transmission of electrical data signals to components such as processors, memories, sensors, input devices, output devices, and communication devices. Accordingly, the communication path 704 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 700 includes one or more memory modules 706 coupled to the communication path 704. The one or more memory modules 706 may comprise RAM, ROM, flash memories, hard drives, or any device capable of storing machine readable and executable instructions such that the machine readable and executable instructions can be accessed by the one or more processors 702. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 706. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 3, the example vehicle system 700 comprises a satellite antenna 708 coupled to the communication path 704 such that the communication path 704 communicatively couples the satellite antenna 708 to other modules of the vehicle system 700. The satellite antenna 708 is configured to receive signals from global positioning system satellites. Specifically, in one embodiment, the satellite antenna 708 includes one or more conductive elements that interact with electromagnetic signals transmitted by global positioning system satellites. The received signal is transformed into a data signal indicative of the location (e.g., latitude and longitude) of the satellite antenna 708 or an object positioned near the satellite antenna 708, by the one or more processors 702. Thus, also referring to FIG. 2, the satellite antenna 708 allows the vehicle 642 to monitor its location. The vehicle 642 may transmit its location to the remote computing device 680, as explained in further detail below.

With reference to FIGS. 2 and 3, the vehicle system 700 comprises one or more vehicle sensors 710. Each of the one or more vehicle sensors 710 is coupled to the communication path 704 and communicatively coupled to the one or more processors 702. The one or more vehicle sensors 710 may include, but are not limited to, Lidar sensors, Radar sensors, optical sensors (e.g., cameras, laser sensors, proximity sensors, location sensors), and the like. The vehicle sensors 710 may be used to navigate the vehicle 642. In addition, the vehicle sensors 710 may detect information about nearby environmental parameters, or information on the environment surrounding the vehicle 642. The environmental parameters may include any information that influences where the vehicle 642 will travel. For instance, the environmental parameters may include a lead traffic pattern, an oncoming traffic pattern, a roadway layout, a traffic light, and a traffic sign. The lead traffic pattern includes the direction, speed, flow, and density of traffic ahead of the vehicle, such as, but not limited, vehicle 648 in FIG. 2. The oncoming traffic pattern includes the direction, speed, flow, and density of traffic in the oncoming lane relative to the vehicle, such as, but not limited to, vehicle 650 in FIG. 2. The roadway layout may include a particular road or traffic design in the immediate environment of the vehicle. The roadway layout may include the geometric design of the road, such as roadway 670 in FIG. 2, such as whether the vehicle 642 is on a straightaway with no outlets, is approaching a t-intersection, a cross intersection, a y-intersection, or any other roadway design. This information may be collected from the vehicle sensors, or may be collected from a global positioning system. The roadway layout may also include the traffic design for a specific road. For instance, the traffic design may be one-way or two-way traffic. The roadway layout may further include vehicle recognition of whether the vehicle 642 is in a left turn only lane, a right turn only lane, or any other designated traffic lane. The vehicle sensors may also collect information on all traffic lights 660 and traffic signs 662 in the environment of the vehicle 642, which indicate where the vehicle 642 may travel.

In some embodiments, the environmental parameters may include information from remote vehicles in the environment of the vehicle that is communicated to the vehicle through V2V communication. For instance, a remote vehicle, such as vehicle 650, may include the necessary hardware and processing equipment designed to carry out the method described herein with relation to vehicle 642. Therefore, the remote vehicle will be able to predict its most likely path of travel and communicate this path to the vehicle 642. If the remote vehicle is in oncoming traffic, information indicating that the remote vehicle will most likely proceed straight or turn right may be communicated to the vehicle 642 and considered along with the environmental parameters described above. In other embodiments, remote vehicles need not predict their own future path of travel and communicate the path to vehicle 642. For instance, the vehicle sensors 710 may collect data on remote vehicles such as the speed of the remote vehicles, the angles of the wheels of the remote vehicle, etc. This information in connection with the roadway infrastructure data may allow remote computing device 680 to generate a probability distribution on a future behavior of the remote vehicle or predict a future path of a remote vehicle without any shared or communicated information from the remote vehicle. The predicted path or probability distribution of future behavior of remote vehicles may then be considered in generating the curvilinear coordinate system and probability distribution for vehicle 642, as described below. In some embodiments, the predicted path of remote vehicles is merely taken into consideration when generating the curvilinear coordinate system for vehicle 642. In other embodiments, the predicted path of remote vehicles may be plotted directly on the curvilinear coordinate system as additional radii of curvature emanating from the current position of the remote vehicles. This description is a non-limiting example of the environmental parameters that may be collected, however, and it should be appreciated that any parameters that influence a path of travel of a vehicle may be considered. Also, while the description to follow discusses training and improvement of predicting a future vehicle behavior of a vehicle of interest, such as vehicle 642, it should be appreciated that such improvements in prediction will also allow for more accurate predictions of a future path of travel of a remote vehicle.

The vehicle sensors 710 may also collect vehicle parameters on the vehicle 642. The vehicle parameters may include, but are not limited to, a position of the vehicle 642, a speed of the vehicle 642, a velocity of the vehicle 642, a blinker usage of the vehicle 642, a steering wheel angle of the vehicle 642, a kinematic restraint of the vehicle 642, and a gaze of a driver of the vehicle 642. A blinker usage of the vehicle 642 includes whether the vehicle blinker is not operating, blinking right, or blinking left. The kinematic restraints of the vehicle 642 may include any restraints on the vehicle 642 in the physical world. The kinematic restraints will vary depending on whether the vehicle 642 is a four-wheel automobile, and eighteen-wheel truck, a motorcycle, or any other vehicle of interest. For example, the kinematic restraints of the vehicle 642 may include the turning radius, or the tightest possible turn, that the vehicle 642 can make. The kinematic restraints may also include, depending on the center of gravity of the vehicle 642, the ability of the vehicle 642 to make certain maneuvers, such as turns, at certain speeds. In the case of a manually operated vehicle, the vehicle 642 may include internal visual sensors that are directed at the face or eyes of the driver. The sensors may be able to detect the gaze of the driver, for instance, whether the driver is looking straight ahead, slightly to the left, or slightly to the right.

The information detected by the vehicle sensors 710 may be used to train a neural network to generate the curvilinear coordinate system 600, generate a probability distribution, and predict a future behavior of vehicle 642, as explained in further detail below.

Still referring to FIGS. 2 and 3, the vehicle system 700 comprises network interface hardware 712 for communicatively coupling the vehicle system 700 to the remote computing device 680. The network interface hardware 712 can be communicatively coupled to the communication path 704 and can be any device capable of transmitting and/or receiving data via a network. Accordingly, the network interface hardware 712 can include a communication transceiver for sending and/or receiving any wired or wireless communication. For example, the network interface hardware 712 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 712 includes hardware configured to operate in accordance with the Bluetooth® wireless communication protocol. The network interface hardware 712 of the vehicle system 700 may transmit information detected by the vehicle sensors 710 to the remote computing device 680. In some examples, the network interface hardware 712 may transmit one or more images captured by the vehicle sensors 710 to the remote computing device 680. In some examples, the network interface hardware 712 may receive data transmitted from the remote computing device 680 that the vehicle 642 may use to navigate.

In some embodiments, the vehicle system 700 may be communicatively coupled to the remote computing device 680 by a network. In one embodiment, the network may include one or more computer networks (e.g., a personal area network, a local area network, or a wide area network), cellular networks, satellite networks and/or a global positioning system and combinations thereof. Accordingly, the vehicle system 700 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 4:
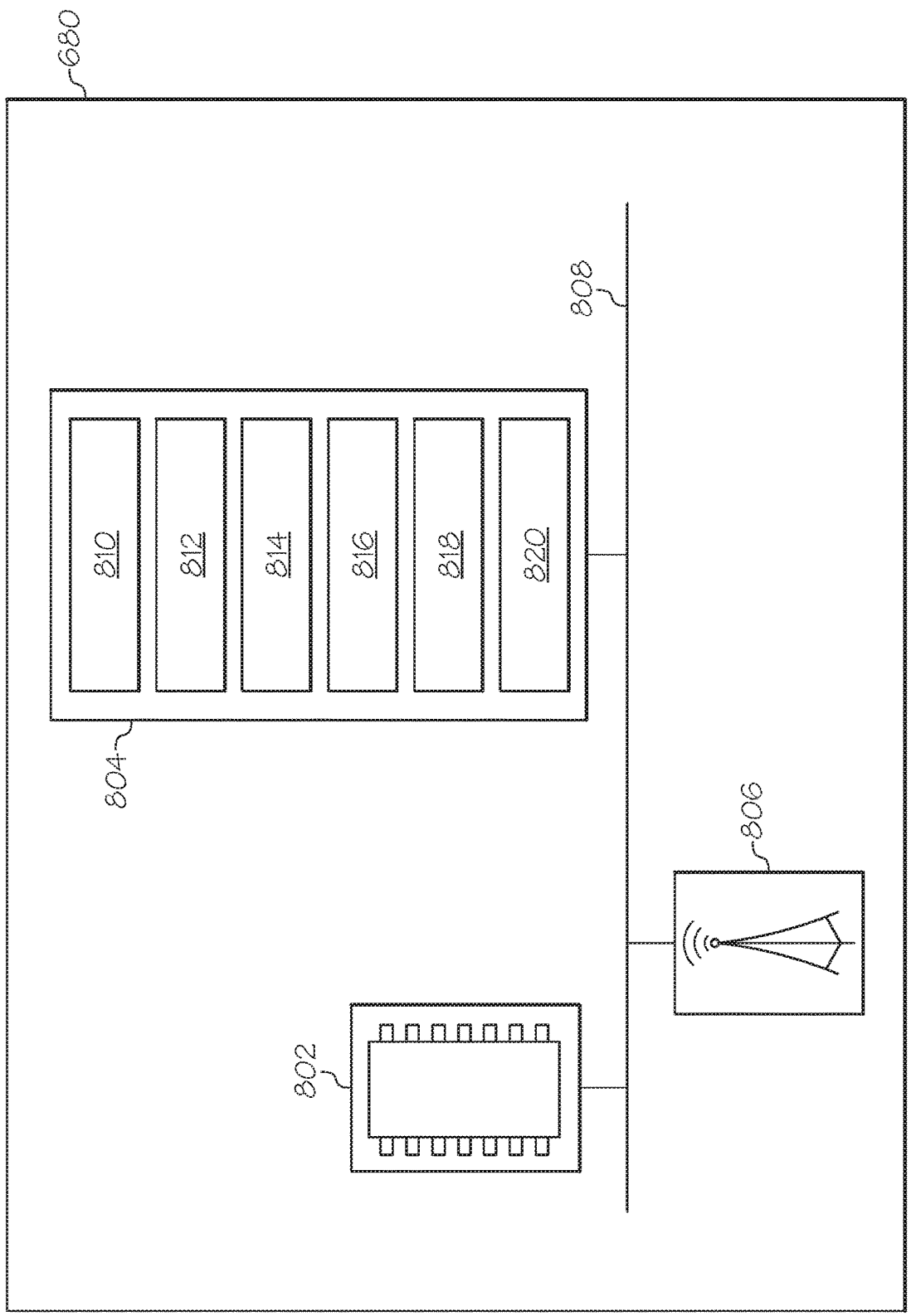
FIG. 4 schematically depicts a computing device for generating curvilinear coordinate systems and predicting future vehicle behaviors, according to one or more embodiments shown or described herein.

Now referring to FIG. 4, the remote computing device 680 is discussed. The remote computing device 680 may predict future vehicle behavior and improve predictions through supervised or unsupervised learning techniques as described herein.

Referring to FIG. 4, the remote computing device 680 comprises one or more processors 802, one or more memory modules 804, network interface hardware 806, and a communication path 808. The one or more processors 802 may be a controller, an integrated circuit, a microchip, a computer, or any other computing device. The one or more memory modules 804 may comprise RAM, ROM, flash memories, hard drives, or any device capable of storing machine readable and executable instructions such that the machine readable and executable instructions can be accessed by the one or more processors 802. The communication path 808 provides signal interconnectivity between various modules of the remote computing device 680.

The network interface hardware 806 can be communicatively coupled to the communication path 808 and can be any device capable of transmitting and/or receiving data via a network. Accordingly, the network interface hardware 806 can include a communication transceiver for sending and/or receiving any wired or wireless communication. For example, the network interface hardware 806 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 806 includes hardware configured to operate in accordance with the Bluetooth® wireless communication protocol. The network interface hardware 806 of the remote computing device 680 may transmit and receive data to and from the vehicle 642 depicted in FIG. 2.

The one or more memory modules 804 include a database 810, a curvilinear coordinate system generation module 812, a training data capture module 814, a neural network training module 816, a probability distribution generation module 818, and a future vehicle behavior prediction module 820. Each of the database 810, the curvilinear coordinate system generation module 312, the training data capture module 814, the neural network training module 816, the probability distribution generation module 818, and the future vehicle behavior prediction module 820 may be a program module in the form of operating systems, application program modules, and other program modules stored in one or more memory modules 804. In some embodiments, the program module may be stored in a remote storage device that may communicate with the remote computing device 680. In some embodiments, one or more of the database 810, the curvilinear coordinate system generation module 812, the training data capture module 814, the neural network training module 816, the probability distribution generation module 818, and the future vehicle behavior prediction module 820 may be stored in the one or more memory modules 706 of the vehicle system 700 depicted in FIG. 3. Such a program module may include, but is not limited to, routines, subroutines, programs, objects, components, data structures and the like for performing specific tasks or executing specific data types as will be described below.

The database 810 may temporarily store data received from the vehicle 642 of FIG. 2. The data received from the vehicle 642 may include data captured by the vehicle sensors 710 of FIG. 3, such as data on vehicle and environmental parameters. In some examples, the remote computing device 680 may receive data captured by other devices, such as traffic cameras. This information may also be stored in the database 810. The data received from the vehicle 642 and/or other devices may include observed features of the roadway 670 of FIG. 2, for instance. The database 810 may also collect and store historical vehicle operating data associated with a particular driver. For instance, a processor may store historical operating data with each particular driver operating the vehicle 642 when the data was collected. The historical operating data may indicate that a particular driver does not turn right when travelling above a certain speed, for instance. In some embodiments, the database 810 may also include vehicle operating data from a fleet of vehicles. The fleet operating data may indicate trends across the entire fleet of vehicles, such as, but not limited to, turning right at certain speeds.

Referring still to FIG. 4, the curvilinear coordinate system generation module 812 generates a curvilinear coordinate system, such as the curvilinear coordinate system 600, for the vehicle 642, depicted in FIG. 2, based on the detected vehicle and environmental parameters and the data stored in database 810. As briefly explained above, the specific design of the curvilinear coordinate system may vary depending on the environmental and vehicle parameters collected. Particularly, the number of turning horizons, number of radii of curvature, and the distribution of radii of curvature may depend on the collected parameters. In some embodiments, in all cases, the curvilinear coordinate system may include an infinite number of turning horizons and an infinite number of radii of curvature. In some embodiments, the radii of curvature are symmetrically distributed throughout the curvilinear coordinate system. In some embodiments, as described below, the curvilinear coordinate system generation module 812 may be trained to improve speed, efficiency, and processing power. For instance, the curvilinear coordinate system generation module 812 may recognize that based on the environmental parameters and vehicle parameters collected, the radii of curvature may be weighted and unevenly distributed.

Figure 7:
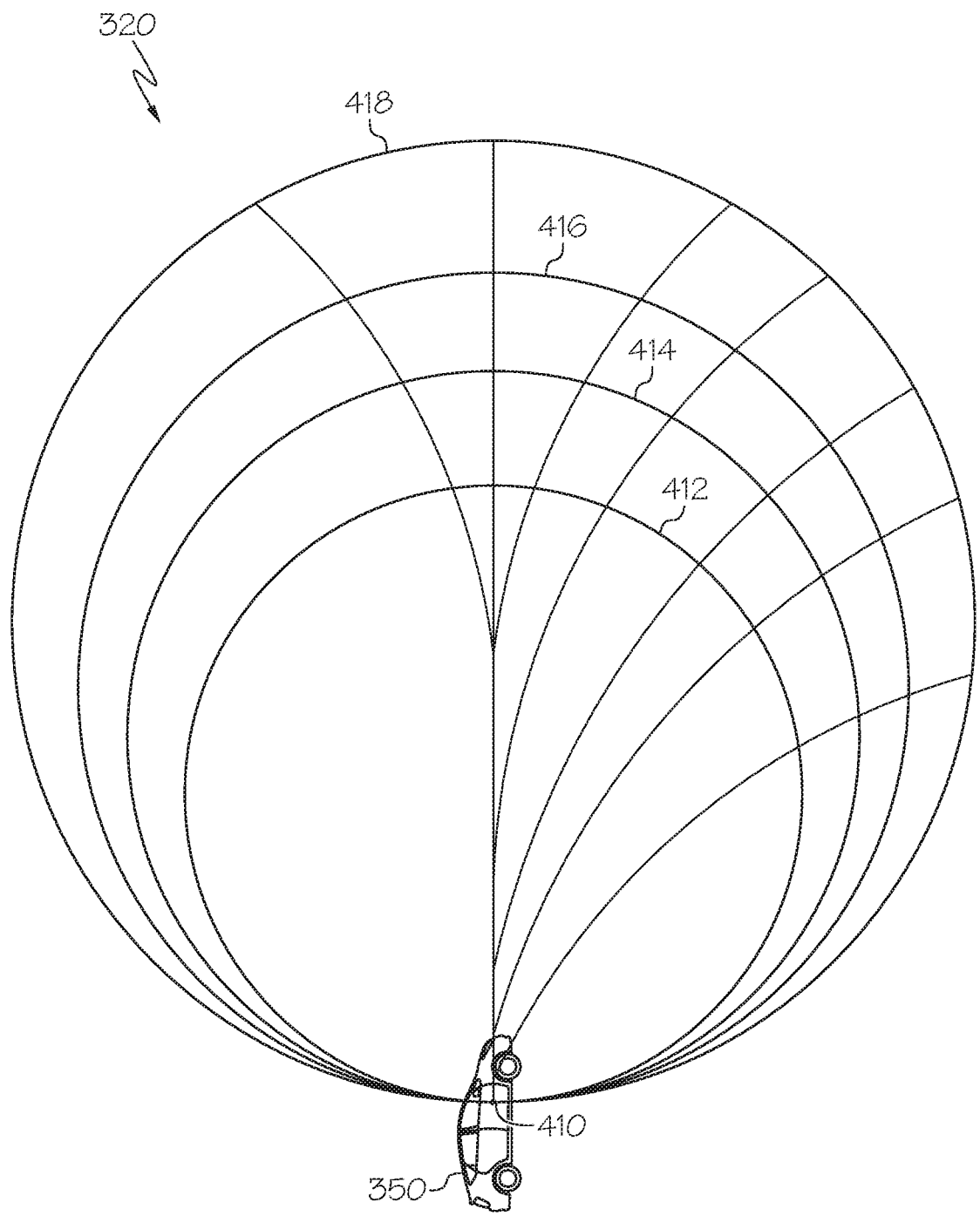
FIG. 7 schematically depicts a second curvilinear coordinate system in the log of curvilinear coordinate systems of FIG. 3, according to one or more embodiments shown or described herein.

Without limitation, if the collected environmental parameters indicate that there is no road to the left of the vehicle 642, or in other words, the vehicle 642 could not make a left turn and remain on paved road, and the collected vehicle parameters indicate that the vehicle wheels are currently angled to the right, the processor may distribute more radii of curvature to the right of the curvilinear coordinate system than to the left of the curvilinear coordinate system. More particularly, the curvilinear coordinate system may include more radii of curvature that curve to the right of a straight radius of curvature, such as the radius of curvature 617 in FIG. 2, than curve to the left of the straight radius of curvature 617 of the curvilinear coordinate system. As another example, if the collected vehicle parameters indicate that it is not physically possible for the vehicle 642 to complete certain maneuvers, the curvilinear coordinate system may not include radii of curvature directed to those certain maneuvers. More specifically, if it is not possible for the vehicle to complete a turn of a certain sharpness, or below a particular turning radius, radii of curvature directed to these turns may not be included on the curvilinear coordinate system. FIG. 7, which will be discussed in more detail below, depicts a curvilinear coordinate system with a weighted distribution of radii of curvature. However, it should be appreciated that even in embodiments where the curvilinear coordinate system includes a weighted distribution of radii of curvature or excludes radii of curvature indicative of a vehicle path of travel that is not kinematically possible, the number of radii of curvature on the curvilinear coordinate system may still be so numerous that they could accurately be described as infinite. It should be appreciated that, as used herein, the term "infinite" does not necessarily mean a limitless number. Rather, the term "infinite" could be understood as meaning nearly infinite, and is used to indicate a number large enough that it is beyond human computation and requires a computing or processing device to generate and compute. It should be understood that the term "infinite" is appropriate, as the turning horizons may be generated at increments of time well below a second. Furthermore, the radii of curvature can account for, at least, every physically possible path of travel for the vehicle 642. This would include every minute adjustment of the steering wheel angle of the vehicle 642.

In some examples, one or more environmental or vehicle parameters may have a probability or confidence associated with them. A probabilistic measurement may be given because of measurement uncertainty from sensors or because of uncertainty in algorithms used to identify features. For example, an image analysis algorithm may utilize a neural network or other machine learning model to identify remote vehicles at particular locations on a road portion based on one or more images of the road portion. Rather than identifying remote vehicles with certainty, such algorithms may identify remote vehicles with a certain probability. Thus, this probability of identification may be accounted for in generating the curvilinear coordinate system.

The curvilinear coordinate system generation module 812 may continuously gather the appropriate data and generate appropriate curvilinear coordinate systems, as discussed in more detail below. Thus, each curvilinear coordinate system encapsulates a state of a road portion and vehicle 642 of FIG. 2 at a moment in time. Curvilinear coordinate systems may be associated with a timestamp indicating the time at which the curvilinear coordinate system was generated. The sensor data received from the vehicle 642 and other vehicles and/or traffic infrastructure may include a timestamp indicating when the data was collected. Curvilinear coordinate systems generated by the curvilinear coordinate system generation module 812 may be stored in the database 810 and may be utilized by the other memory modules 804, as explained below.

Still referring to FIG. 4, the training data capture module 814 may capture neural network training data. As explained herein, in the example of FIG. 4, a neural network may be used to predict a future vehicle behavior based on a generated curvilinear coordinate system and collected vehicle and environmental parameters. In other examples, other machine learning models may be used. In the example of FIG. 4, the neural network may be trained using training data comprising a plurality of training examples or incorrect future vehicle behavior predictions captured or generated by the training data capture module 814, as explained herein. The neural network may comprise any neural network architecture having any number of hidden layers or other hyperparameters.

In the example of FIG. 4, a training example comprises a first curvilinear coordinate system and associated vehicle and environmental parameters generated at a first time t=1, and data collected on the actual vehicle future behavior, or the true position of the vehicle at time t=2. The neural network can then be trained to generate curvilinear coordinate systems that more accurately account for future vehicle behaviors. For instance, the future curvilinear coordinate systems may eliminate radii of curvature related to vehicle travel off of paved roads, if it is recognized that these radii are generated in the curvilinear coordinate system and the vehicle never travels such radii at time t=2. This may be achieved by training the neural network which vehicle and environmental parameters are most useful in generating the curvilinear coordinate system and by assigning specific weights to each potential parameter. It should be appreciated that the same principles may be further used to not only improve the generation of the curvilinear coordinate systems, but also the generation of probability distributions and vehicle predictions. In such embodiments, the training example comprises a first curvilinear coordinate system generated at a time t=1 from collected environmental and vehicle parameters, a probability distribution generated from the curvilinear coordinate system at time t=1 and the associated parameters, and a prediction on a future vehicle behavior generated from the probability distribution. The training example may further comprise the detected actual vehicle behavior or path of travel at time t=2. Errors in the prediction made at time t=1 and the actual vehicle position at time t=2 can be recognized and corrected.

Still referring to FIG. 4, the neural network training module 816 may train the neural network using techniques disclosed herein. The neural network may be trained utilizing the training examples described above with respect to the training data capture module 814. Obsolete radii of curvature may be eliminated from future generated curvilinear coordinate systems, and sets of curvilinear coordinate systems and vehicle and environmental parameters may be learned to generate more accurate predictions on future vehicle behavior when similar sets of coordinate systems and parameters are encountered in the future.

Figure 9:
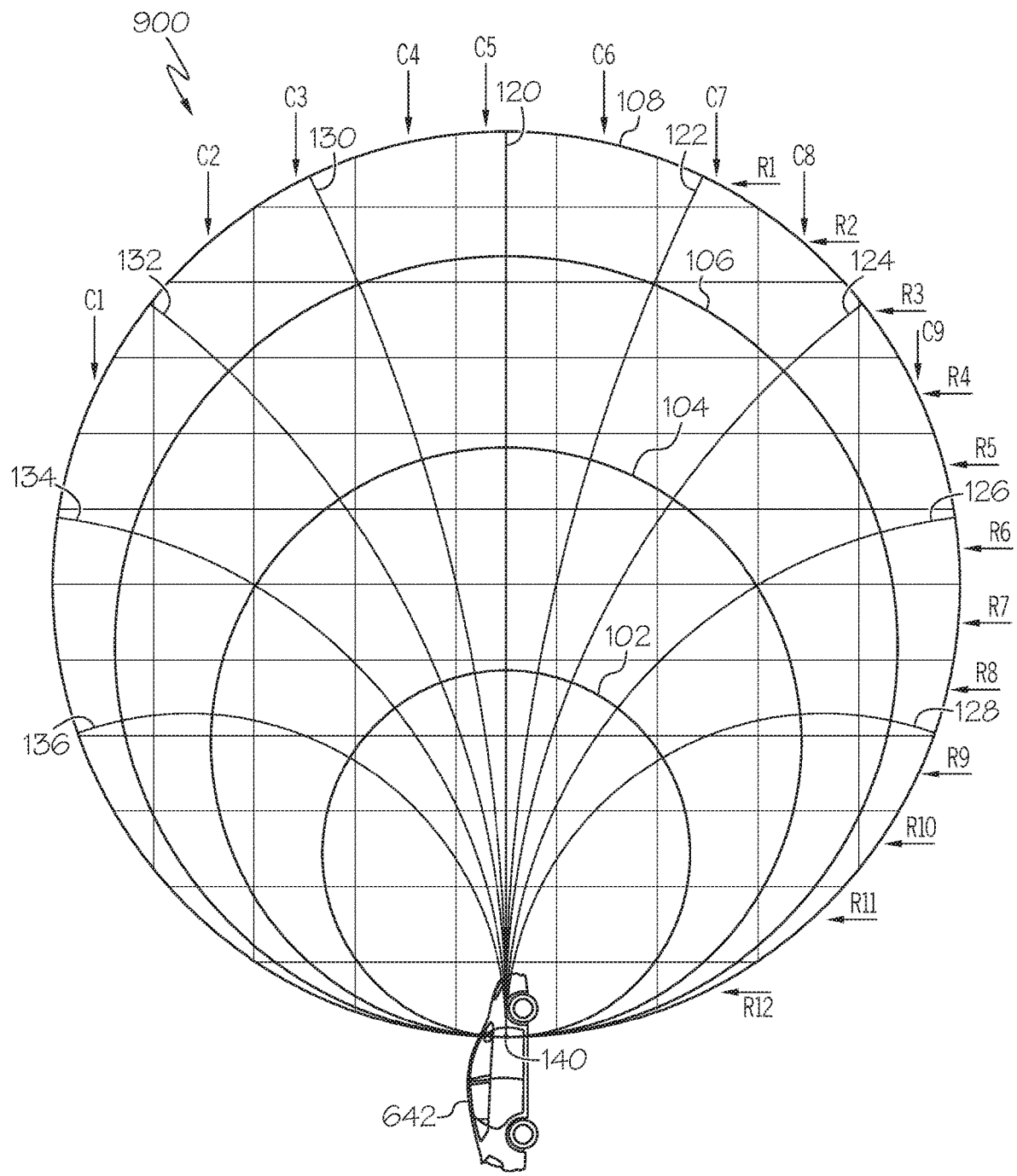
FIG. 9 schematically depicts a discretized curvilinear coordinate system, according to one or more embodiments shown or described herein.

Still referring to FIG. 4, the probability distribution generation module 818 generates a probability distribution based on the curvilinear coordinate system generated by the curvilinear coordinate system generation module 812 and the environmental and vehicle parameters used to generate the curvilinear coordinate system. In some embodiments, the probability distribution may be generated from the curvilinear coordinate system in continuous space. In other embodiments, one or more coordinates the curvilinear coordinate system may be discretized prior to generation of the probability distribution. FIG. 9 depicts a discretized curvilinear coordinate system 900. The curvilinear coordinate system may be discretized with cells of any desirable shape and number. It should be appreciated that the collected environmental and vehicle parameters and generated curvilinear coordinate system may be parameterized as any suitable probability distribution. For example, and without limitation, a multi-modal Gaussian distribution or a particle filter distribution may be generated based on the environmental and vehicle parameters and the curvilinear coordinate system.

Referring to FIG. 4, the future vehicle behavior prediction module 820 generates a prediction of a future vehicle behavior or maneuver based on the probability distribution generated by the probability distribution generation module 818. As used herein the term "vehicle behavior" may be used synonymously with the term "vehicle maneuver" or "future path of travel." For example, if a multi-modal Gaussian distribution were generated by the probability distribution generation module 818, peak detection may be used to identify the most likely future vehicle behavior. As an additional step, if the curvilinear coordinate system were discretized as in FIG. 9, the likelihood of vehicle 642 travelling into or through each cell of the discretized curvilinear coordinate system 900 may be determined. The probability distribution with respect to each cell in turn affects the probability distribution associated with adjacent cells. For instance, if there is a high probability that the vehicle will be in cell (R6, C7), the probability distributions in adjacent cells (R5, C7) and (R5, C8) may similarly, show a strong probability of a future presence of the vehicle 642.

The probability distribution generated by the probability distribution generation module 818 may effectively assign a probability to the likelihood that the vehicle 642 will travel each radius of curvature of the curvilinear coordinate system 600 of FIG. 2. The most likely future vehicle behavior corresponds to a particular radius of curvature of the curvilinear coordinate system 600 that the vehicle 642 is predicted to travel. This allows for analysis and prediction beyond simply predicting whether a vehicle will travel straight, turn right, or turn left. Instead, predictions can be made on a particular and continuous future path of travel of the vehicle 642. For instance, with reference back to FIG. 2, the radius of curvature 621 may be predicted as the most likely future path of travel of vehicle 642. The radius of curvature 621 may be followed any desirable amount of time into the future. In other words, and as explained above, the radius of curvature intersects each turning horizon 602, 604, 606, and 608. Furthermore, each turning horizon represents a particular point in time and the circumference of each turning horizon is comprised of particular points in space. Therefore, if it is predicted that the vehicle will travel the radius of curvature 621, it can be further predicted that at time t=1, associated with turning horizon 608, the vehicle will particularly be at point 682, where the point 682 is the point where the radius of curvature 621 intersects with the turning horizon 608. Identifying additional intersections between the radius of curvature 621 and the turning horizons on the curvilinear coordinate system 600, such as at points 683, 684, and 685, reveals predictions of where precisely the vehicle will be in space at time t=2, t=3, t=4, and so on, which are each respectively associated with the turning horizons 606, 604, and 602. With reference to FIG. 9, depicting the discretized curvilinear coordinate system 900, analyzing the probability distribution with respect to each cell may reveal a future path of vehicle travel on a radii of curvature. For instance, it can be determined that the vehicle 642 will likely travel a radius of curvature that passes through or is contained in the cells containing the highest probabilities of containing the vehicle 642 in the future.

Figure 5:
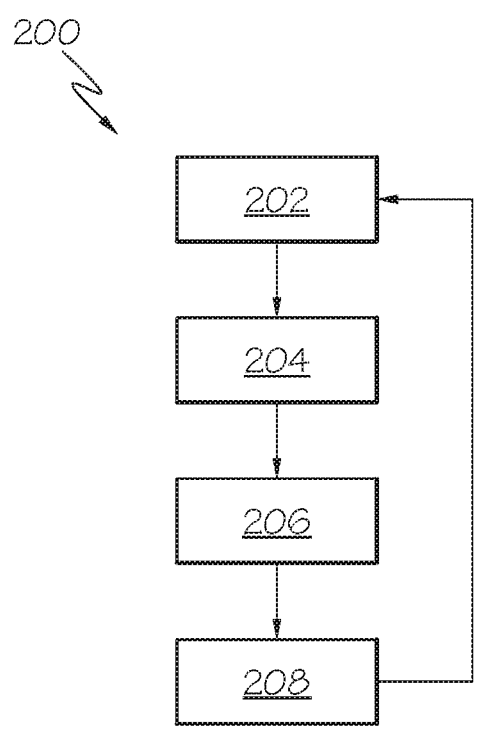
FIG. 5 schematically depicts a flowchart of a method of continuously generating the curvilinear coordinate systems and predictions on future vehicle behaviors, according to one or more embodiments shown or described herein.

As mentioned above, the remote computing device 680 may continuously update the curvilinear coordinate system associated with a vehicle of interest and, therefore, continuously update predictions on a future vehicle behavior. FIG. 5 depicts a flowchart 200 depicting a method of continuously generating curvilinear coordinate systems and predicting future vehicle maneuvers. At step 202, environmental and vehicle parameters are collected, as discussed in detail above. As an example, the environmental parameters may include a roadway infrastructure, the position of remote vehicles or obstacles, and predictions of where the remote vehicles are travelling. Also, as an example, the vehicle parameters may include a current position of the vehicle, a current speed of the vehicle, and a steering wheel angle of the vehicle. Based on this collected information, the curvilinear coordinate system generation module 812, as described above with reference to FIG. 4, may generate a curvilinear coordinate system including turning horizons and radii of curvature at step 204. The turning horizons are tangential at a seed point representing a current position of the vehicle and radii of curvature emanate from the seed point, representing possible future vehicle behaviors or paths of travel. At step 206, and as explained above with reference to FIG. 4, the probability distribution generation module 818 may generate a probability distribution based on the generated collected environmental and vehicle parameters at step 202 and the curvilinear coordinate system generated at step 204. At step 208, as explained above with reference to FIG. 4, the future vehicle behavior prediction module 820 may predict a certain vehicle behavior or path of travel based on the probability distribution. Following the prediction at step 208, a new set of parameters may be immediately collected at step 202 to update the curvilinear coordinate system and future vehicle behavior prediction.

Figure 6:
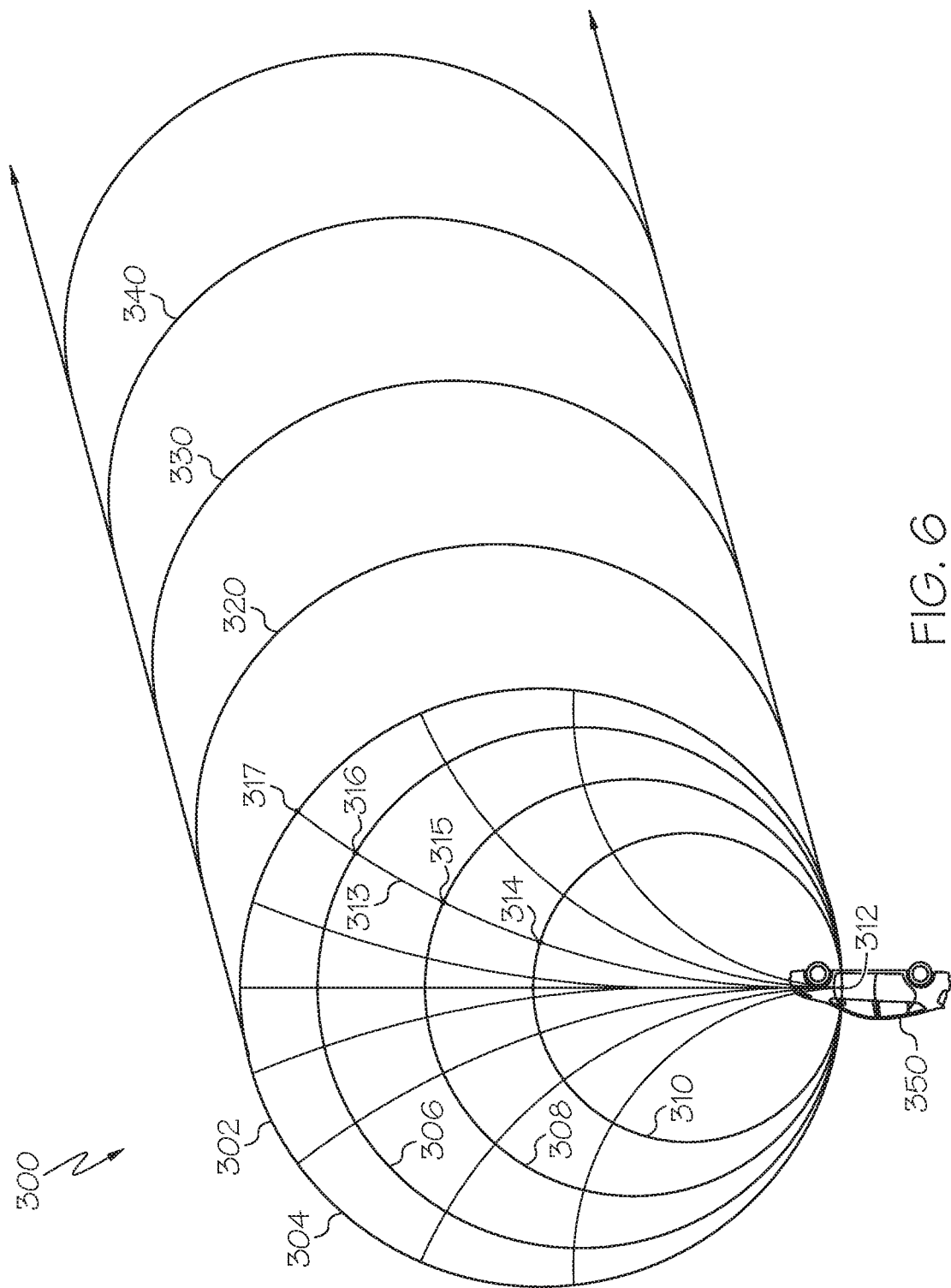
FIG. 6 schematically depicts a continuous log of curvilinear coordinate systems, according to one or more embodiments shown or described herein.

The continuity of the curvilinear coordinate system generation and future vehicle behavior prediction will now be discussed with reference to FIG. 6, which depicts a "log" 300 of curvilinear coordinate systems through time. A curvilinear coordinate system 302 is depicted at the face of the log 300. The curvilinear coordinate system 302 includes a seed point 312. The seed point 312 represents time t=0 and a current position of the vehicle 350, which may be similar in all respects to the vehicle 642 described above. The curvilinear coordinate system also includes turning horizons 310, 308, 306, and 304, which correspond to time t=1, t=2, t=3, and t=4, respectively. The curvilinear coordinate system 302 includes radii of curvature, including radius of curvature 313. The curvilinear coordinate system 302 may be generated by the collection of environmental and vehicle parameters, as discussed above. From the collected parameters and generated curvilinear coordinate system 302, a probability distribution may then be generated. A specific vehicle behavior may then be predicted. For example, it may be predicted that the vehicle 350 will travel the radius of curvature 313. In other words, at time t=1, the vehicle 350 is predicted to be at point 314, at time t=2, the vehicle 350 is predicted to be at point 315, at time t=3, the vehicle 350 is predicted to be at point 316, and at time t=4, the vehicle 350 is predicted to be at point 317.

The log 300 also includes curvilinear coordinate systems 320, 330, and 340. It should be appreciated that the curvilinear coordinate systems are depicted to be of arbitrary thickness for illustrative purposes. The curvilinear coordinate system 320 may be generated at time t=1, the curvilinear coordinate system 330 may be generated at time t=2, and the curvilinear coordinate system 340 may be generated at time t=3. The curvilinear coordinate system 320 is depicted in FIG. 7. The curvilinear coordinate system 320 depicts an example of a weighted distribution of radii of curvature, as discussed above. After predicting that the vehicle 350 will travel the radius of curvature 313 of the curvilinear coordinate system 302, new environmental and vehicle parameters may be collected. In some embodiments, assuming the collection of new parameters takes place immediately after the prediction based on the curvilinear coordinate system 302, the elapse of time may be small enough that many of the collected parameters are the same. If the vehicle 350 is in motion, however, at least the current position of the vehicle 350 will change. The seed point 410 of the curvilinear coordinate system 320 now represents time t=1. The seed point 410 also represents the actual position of the vehicle 350 at time t=1. If the prediction generated from the curvilinear coordinate system 302 of FIG. 6 were precisely correct, the seed point 410 would be the same point as the point 314 of the curvilinear coordinate system 302. However, if the vehicle 350 travelled a path different from the radius of curvature 313 of FIG. 6, then the seed point 410 will be at a different point in space than the point 314. The curvilinear coordinate system 320 includes turning horizons 412, 414, 416, and 418, which correspond to time t=2, t=3, t=4, and t=5, respectively. The curvilinear coordinate system 320 is then used to generate a probability distribution and a new prediction on a future vehicle maneuver. This process of continuously updating the curvilinear coordinate system, probability distribution, and predicted path of travel continues over time with curvilinear coordinate system 330, curvilinear coordinate system 340, and so on.

While the term "vehicle" is used throughout this application, it should be appreciated that the disclosed method may be applied to any number of travelling bodies. For instance, the term "vehicle" may include sedans, trucks, heavy machinery, motorcycles, bicycles, and boats. Additionally the method of generating and utilizing the disclosed curvilinear coordinate system may be manipulated to be applied in n-dimensional space. For instance, the disclosed method could be applied to aircraft, such as airplanes and helicopters, and underwater sea craft, such as submarines, which include three axes of rotation and additional maneuverability in space.

The above method may be used in connection with manually operated vehicles. In such embodiments, predicting a future vehicle maneuver may also be thought of as predicting the decision-making process of a human driver. In such embodiments, the disclosed method may be used to assign a risk value to a vehicle maneuver or a human driver that currently operates the vehicle. The method may predict a most likely future vehicle behavior. In many situations, this future vehicle behavior may be considered a dependable or calculated vehicle behavior. For example, the method may predict that the future vehicle behavior includes making a wide or gradual left turn around oncoming traffic. If the driver were to instead make a fast, sharp left turn ahead of the oncoming traffic, this decision could be assigned a certain risk value. The risk value may be related to the probability of the vehicle behavior. In other words, if the probability distribution generated by the method indicated a very low probability of the vehicle making a sharp left turn, this could be considered in assigning a risk value to the vehicle behavior or driver decision. The spatial variation between the predicted vehicle behavior and the actual vehicle behavior may also be weighed in assigning a risk value. For instance, if the method predicts that the vehicle will travel a path or radius of curvature to the right, and instead, the driver initiates a turn to the left, the spatial distance between the predicted vehicle behavior and the actual behavior may be measured to assign a risk value to the driver decision. This method of risk assessment may also be used in connection with autonomous vehicles to check autonomous vehicle decision-making processes.

When used in connection with manually operated vehicles, the predicted vehicle behavior may be communicated to nearby remote vehicles via any suitable V2V communication. The remote vehicles may be autonomous vehicles or manually operated vehicles. The remote drivers or autonomous vehicles may then account for the predicted vehicle behavior in deciding how to control or operate the remote vehicles.

The vehicle may include an internal display unit which may display the probability distribution generated at step 206 of method 200 or the predicted vehicle behavior from step 208, depicted in FIG. 5. Such a display may assist a manual driver in making vehicle decisions, and may allow a manual driver to assess the risk level of his or her decisions on the road. Such a display may also assist passengers in autonomous vehicles. For instance, such a display may assure passengers that the autonomous vehicle is following high probability maneuvers.

Figure 8:
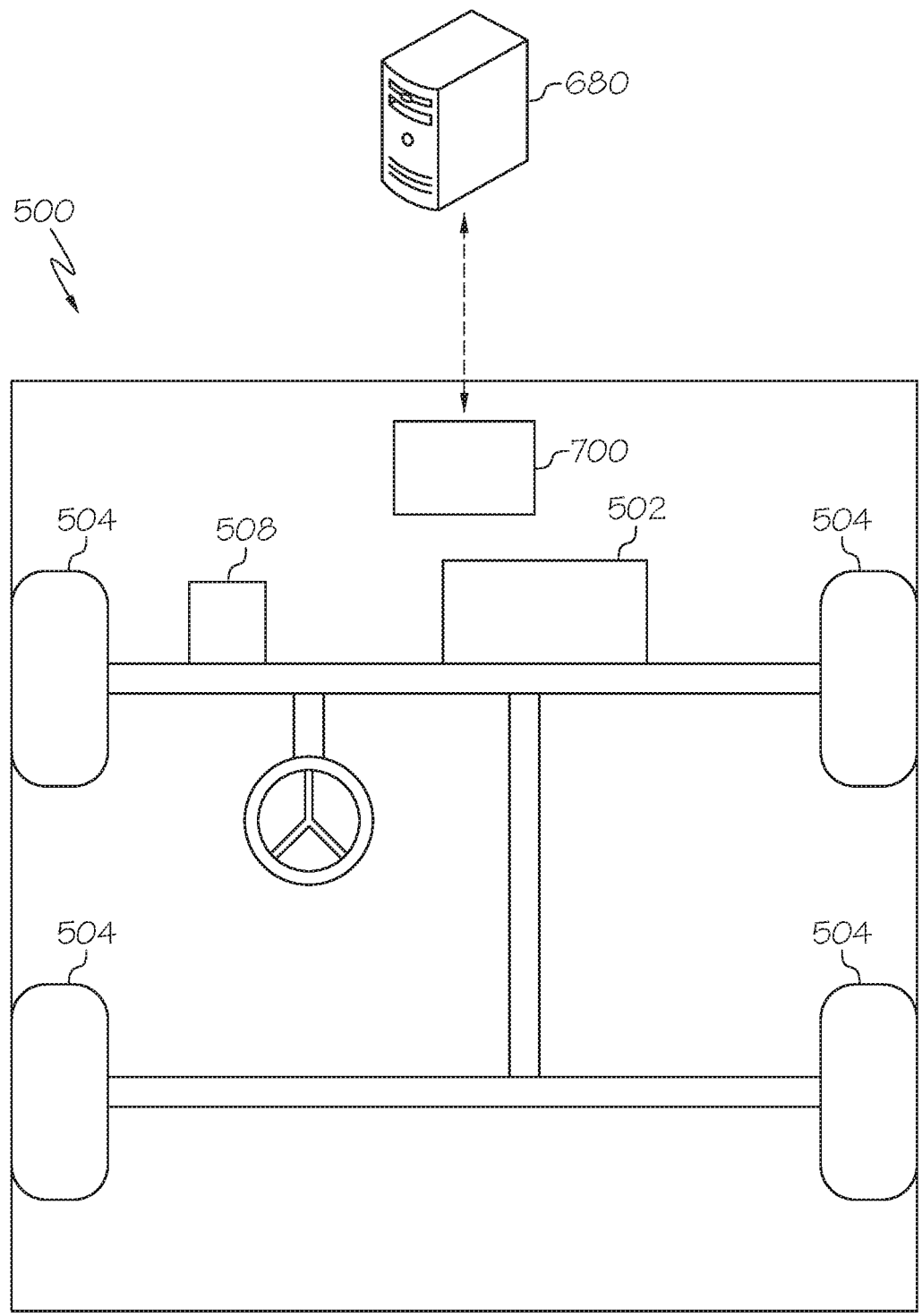
FIG. 8 schematically depicts a vehicle including the vehicle system of FIG. 3 for generating curvilinear coordinate systems and predicting future vehicle movements, according to one or more embodiments shown or described herein.

Referring now to FIG. 8, a schematic depiction of an example vehicle 500 is depicted. The vehicle 500 includes a motor 502, wheels 504, the vehicle system 700 in wireless communication with the remote computing device 680, and a display unit 508. The vehicle system 700 may be configured as discussed above. Therefore, the vehicle system 700 may be configured to collect vehicle and environmental parameters. The remote computing device 680 may be configured as discussed above. Therefore, the remote computing device 680 may be configured to generate a curvilinear coordinate system, generate a probability distribution, and predict a future vehicle behavior. The probability distribution or the predicted future vehicle behavior may be displayed on the display unit 508 for the convenience of drivers or passengers within the vehicle 500. The vehicle 500, as described above, may be an autonomous or manually operated vehicle. Further, while the vehicle 500 is depicted having four wheels 504, it should be appreciated that the vehicle 500 may have any suitable number of wheels 504.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method comprising:
   generating a curvilinear coordinate system from a current position of a vehicle,
   wherein the curvilinear coordinate system comprises:
      turning horizons that increase in diameter with time, wherein a circumference of each turning horizon comprises points in space; and
      radii of curvature, wherein each radius of curvature represents a potential path of the vehicle in space;
   generating a probability distribution from the curvilinear coordinate system; and
   predicting a future vehicle behavior of the vehicle based on the probability distribution.

2. The method of claim 1, wherein the future vehicle behavior of the vehicle comprises travelling a radius of curvature to a point in space on a turning horizon.

3. The method of claim 2, wherein the turning horizons are tangential at a point representing the current position of the vehicle.

4. The method of claim 3, wherein the radii of curvature emanate from the point representing the current position of the vehicle.

5. The method of claim 4, wherein the curvilinear coordinate system is generated based on environmental parameters and vehicle parameters.

6. The method of claim 5, wherein the curvilinear coordinate system further comprises an infinite number of turning horizons and an infinite number of radii of curvature.

7. The method of claim 5, wherein the radii of curvature are unevenly distributed in space based on the environmental parameters and the vehicle parameters.

8. The method of claim 5, wherein the probability distribution is based on the curvilinear coordinate system and the environmental parameters and the vehicle parameters.

9. The method of claim 8, wherein the probability distribution is used to assign a risk value to a vehicle behavior.

10. The method of claim 8, wherein the curvilinear coordinate system and the probability distribution continuously update in time.

11. The method of claim 8, wherein the environmental parameters include one or more of: a lead traffic pattern, an oncoming traffic pattern, a roadway layout, a traffic light, and a traffic sign.

12. The method of claim 11, wherein the environmental parameters further include a probability distribution of a future vehicle behavior of a remote vehicle in an environment of the vehicle.

13. The method of claim 8, wherein the vehicle parameters include one or more of: a speed of the vehicle, a velocity of the vehicle, a blinker usage of the vehicle, a steering wheel angle of the vehicle, a kinematic restraint of the vehicle, and a gaze of a driver of the vehicle.

14. The method of claim 13, wherein the vehicle parameters further include historical vehicle operating data associated with a particular driver.

15. The method of claim 13, wherein the vehicle parameters further include vehicle operating data from a fleet of vehicles, the vehicle operating data collected from a wireless network in communication with the fleet of vehicles.

16. A vehicle comprising:
   a motor;
   two wheels; and
   an electronic vehicle system in wireless communication with a remote computing device, configured to:
      generate a curvilinear coordinate system from a current position of the vehicle based on environmental parameters and vehicle parameters, wherein the curvilinear coordinate system comprises:
         turning horizons that increase in diameter with time, wherein a circumference of each turning horizon comprises points in space; and
         radii of curvature, wherein each radius of curvature represents a potential path of the vehicle in space;
      generate a probability distribution from the curvilinear coordinate system; and
      predict a future vehicle behavior of the vehicle based on the probability distribution.

17. The vehicle of claim 16, wherein
the turning horizons are tangential at a point representing the current position of the vehicle and
the radii of curvature emanate from the point representing the current position of the vehicle.

18. The vehicle of claim 17, wherein:
the probability distribution is based on the curvilinear coordinate system and the environmental parameters and the vehicle parameters; and
the future vehicle behavior of the vehicle comprises travelling a radius of curvature to a point in space on a turning horizon.

19. A system for predicting a future vehicle behavior of a vehicle, the system comprising:
an electronic processing device comprising computer readable instructions, that when executed, cause the electronic processing device to:
collect environmental and vehicle parameters for the vehicle;
generate a curvilinear coordinate system from a current position of the vehicle based on the environmental and vehicle parameters, wherein the curvilinear coordinate system further comprises;
turning horizons that increase in diameter with time, wherein:
a circumference of each turning horizon comprises points in space; and
the turning horizons are tangential at a point representing the current position of the vehicle; and
radii of curvature, wherein:
each radius of curvature represents a potential path of the vehicle in space; and
the radii of curvature emanate from the point representing the current position of the vehicle;
generate a probability distribution from the curvilinear coordinate system; and
predict the future vehicle behavior of the vehicle based on the probability distribution, wherein the future vehicle behavior comprises travelling a radius of curvature to a point in space on a turning horizon.

* * * * *

UNITED STATES PATENT AND TRADEMARK OFFICE
CERTIFICATE OF CORRECTION

| | |
|---|---|
| PATENT NO. | : 11,618,476 B2 |
| APPLICATION NO. | : 16/894348 |
| DATED | : April 4, 2023 |
| INVENTOR(S) | : Stephen G. McGill, Guy Rosman and Paul Drews |

It is certified that error appears in the above-identified patent and that said Letters Patent is hereby corrected as shown below:

On the Title Page

Item (74), attorney, agent, or firm, delete "Dinsmore & Shohl LLC" and insert --Dinsmore & Shohl LLP--, therefor.

In page 2, Column 1, item (56), other publications, cite no. 3, delete "Kuan-Yuan Ren, et al." and insert --Yuan-Yuan Ren, et al.--, therefor.

In the Specification

In Column 2, Line(s) 26, delete "embodiment" and insert --embodiments--, therefor.

Signed and Sealed this
Twenty-fifth Day of June, 2024

Katherine Kelly Vidal
*Director of the United States Patent and Trademark Office*